Jan. 15, 1929.
A. E. BRONSON
1,699,277
CLOSURE MEMBER FOR VALVE STEMS
Filed April 17, 1924
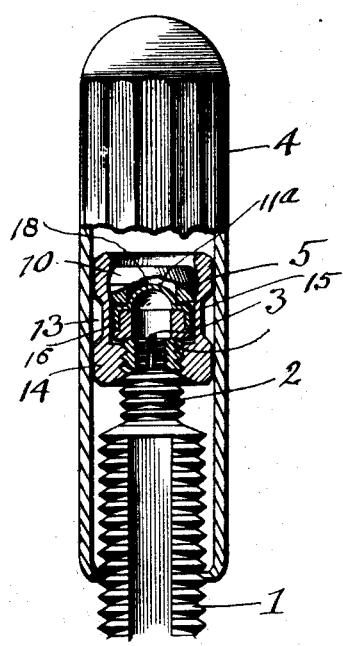
Fig. 1.
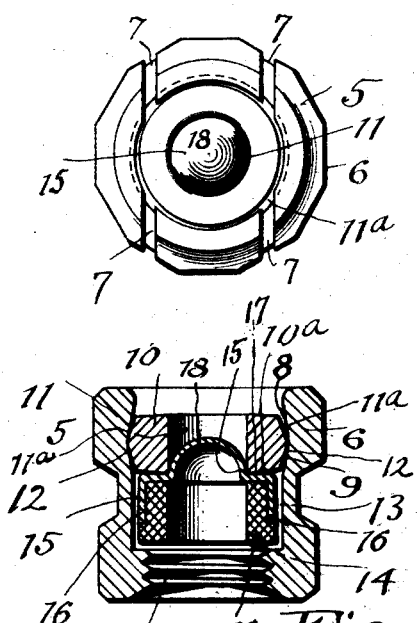
Fig. 2.
Fig. 3.
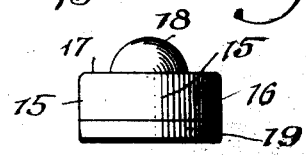
Fig. 4.
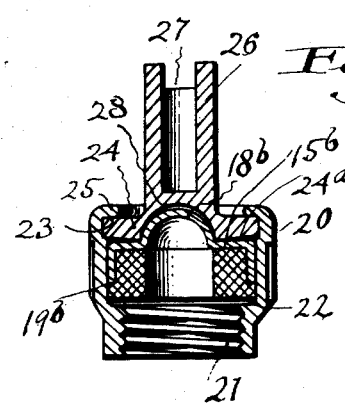
Fig. 5.
INVENTOR
Adelbert E. Bronson
BY Thurston Kwis + Hudson.
ATTORNEYS.

Patented Jan. 15, 1929.

1,699,277

UNITED STATES PATENT OFFICE.

ADELBERT E. BRONSON, OF CLEVELAND, OHIO, ASSIGNOR TO THE DILL MANUFACTURING COMPANY, OF CLEVELAND, OHIO, A CORPORATION OF OHIO.

CLOSURE MEMBER FOR VALVE STEMS.

Application filed April 17, 1924. Serial No. 707,286.

The present invention relates to a construction for use in connection with closing the end of a valve stem, such as is used in connection with pneumatic tires, whereby the stem of the valve insides is entirely free from contact with any portion of the closure member, and yet the closure member co-operates with the sides of the valve stem proper to pack it against the escape of air.

The particular application of the present invention is made without limitation as to any other or extended use which it might have.

The present invention is particularly useful in forming a part of the usual valve stem cap for closing the ends of valve stems as at present used. It is also particularly useful in connection with a combined dust cap and valve cap, such as is shown in the accompanying drawing and will be more fully explained later on.

Reference should be had to the accompanying drawings forming a part of this specification, in which Fig. 1 is an elevation with portions in section of a dust cap in position upon the valve stem, which dust cap contains the present invention; Fig. 2 is a top plan view of an expansible nut within the dust cap; Fig. 3 is an elevation of the expansible nut and parts contained therein including the closure member; Fig. 4 is an elevation of the closure member. Fig. 5 is a sectional elevation of a modified embodiment of the invention.

Referring to the drawings, and more particularly to Fig. 1, 1 is a valve stem of usual construction, being provided with threads upon the outer surface thereof, and also provided with the reduced neck portion 2 which is threaded upon its exterior. This valve stem is of usual and well known construction, and is adapted to receive upon the inside thereof any suitable form of valve insides, and in the drawing a stem for such a valve insides is indicated at 3.

In the manufacture of these stems it frequently happens that the end of the stem 3 may extend slightly beyond the end of the valve stem proper so that any means which may be used to pack the end of the valve stem and prevent leakage of air is likely to interfere with the packing member, and perchance unseat the valve stem 3, causing a decided leakage of air.

A dust cap 4, which may be of usual or any desired construction, is provided, within which is a slidable expansion member indicated at 5. This slidable expansion member has an upwardly extending wall, which is indicated at 6 in Fig. 3, and this wall is provided with transverse slots, such as indicated at 7 in Fig. 2. These slots, when formed in the wall 6, give a certain amount of resiliency to the sections of the wall, making them expansible when they are pressed from the inside outwardly.

The upstanding wall 6 is upon its interior wall fashioned with reentrant side portions such as indicated at 8 and 9, and within the wall portion there is an expanding member 10, which has a hollow central opening 11ª, and upon its outside wall is formed with outwardly diverging surfaces 11 and 12, somewhat complementary to the diverging surfaces 8 and 9 which are formed upon the inner wall of the portion 6. When the member 10 is pushed outwardly the sections of the upstanding wall 6 are expanded outwardly and into contact with the inner surface of the dust cap 4, so that the expansible member 5 and the shell will be securely frictionally locked together.

Below the upstanding wall portion 6 there is a recess which is indicated at 13, which recess has a lower ledge 14, and below the ledge there is an opening 15ª which is threaded. Within the recess 13 there is a packing member which comprises a sheet metal shell 15 which has a skirt portion 16, a top portion 17 and an upwardly extending dome 18, which dome extends within the opening 11 of the expanding member 10.

The lower surface of the expanding member 10 has a receding or slanting surface which is indicated at 10ª, so that the top surface 17 of the sheet metal member 15 is not in contact with the entire outer surface of the expanding member 10, but because of the undercut surface 10ª, the engagement between the sheet metal member 15 is substantially at the base of the dome portion 18, so that there is approximately a line contact between the expanding member 10 and the sheet metal member 15.

Within the sheet metal member 15 there is a packing which is indicated at 19. This packing extends within the flange 16, and has a central opening which is approximately the same diameter as the base diameter of the dome portion 18. Thus the packing member 19 might be considered essentially a washer with a central opening which fits within the sheet metal member 15.

The expansible member 5 has a sliding fit within the shell 4, and the lower threaded portion 15ª is in such position that when the valve stem is thrust within the shell 4, the reduced threaded end thereof, as indicated at 2, may engage with the threads 15ª and as the shell and expansible member 5 are turned the end of the portion 2 of the valve stem is turned up into the member 5, and the upper portion thereof engages with the packing 19. This pushes the packing 19 and the metal member 15 upwardly, and causes the expanding member 10 to be pushed upwardly, thereby pushing outwardly the upstanding portion 6 of the expanding member, causing them to assume a tight frictional grip upon the inner wall of the shell 4, and thus effectually locking the shell member 4 to the valve stem.

As the upper end of the portion 2 of the valve stem engages the packing 19, there is a frictional contact at the engaging surfaces, and due to the fact that the expanding member 10 has practically a line engagement with the top of the sheet metal member 15, the packing 19 and the sheet metal member turn with the valve stem, while of course, the expanding member 10 remains stationary. Thus the packing is not abraded or torn by the end of the valve stem during the relative turning movement between the valve stem 1 and the shell 4. When the upward movement of the expanding member 10 has ceased, due to the wedging action, the packing 19 is in close contact with the edge of the extension 2 on the valve stem, and so operates as a packing to prevent the leakage of air.

The wide central opening in the packing member 19 and the dome 18 of the member 15 all provide ample clearance space for the end of the stem 3 for the valve insides, so that it will not be depressed or contacted.

In Fig. 5 there is shown a modified embodiment of the invention which has been described.

It is quite customary at the present time, particularly with the use of ordinary dust caps, to have a cap screwed directly upon the end of the valve stem, which valve cap is enclosed within a dust cap. A valve cap constructed in accordance with the invention which has been described herein is shown in Fig. 5.

This valve cap comprises a member 20 which has a threaded opening 21 which threaded opening is adapted to co-operate with the reduced portion such as indicated at 2 in Fig. 1, of a valve stem. The member 20 has a recess or chambered portion 22 which lies above the threaded portion 21 and within this recess there is an annular shoulder 23 which extends around the inner wall of the body of the member 20.

Within the recess there is placed the assembly which is shown in Fig. 4 consisting of the cap member 15ᵇ having its dome-shaped portion 18ᵇ and the washer or packing member 19ᵇ which is inserted within the cap member 15ᵇ. Above the cap member 15ᵇ there is a closure plate 24 which engages with the shoulder 23 and is held in position by means of the overturned flange 25. Extending upwardly from this plate 24 is a cylindrical portion 26 which is notched out at the end as indicated at 27, to provide the usual and familiar screw driver provisions.

The plate 24 is provided with a recess 28 which is slightly larger than the greatest diameter of the dome-shaped portion 18ᵇ, and in the assembly of the various elements which have been described the dome-shaped portion 18ᵇ extends into the recess 28. The under side of the plate 24 is cut away as indicated at 24ª, so that the engagement between the cap member 15ᵇ and the plate 24 is practically at the base of the dome 18ᵇ, and on a line contact. Therefore, when the valve cap as an entity, as shown in Fig. 5, is introduced upon the end of the valve stem, and the valve stem contacts with the packing 19ᵇ, the packing and the shell 15ᵇ will remain stationary with respect to the end of the valve stem, and the remainder of the valve cap will turn relative thereto until the valve cap is screwed to its proper position upon the valve stem.

This construction provides for a packing member which is swivelled within the interior of the valve cap proper, so that upon repeated operation the packing is not abraided, and additionally, the construction of the packing member and the shell which is united with it, is such that there is an enlarged central opening so that the stem of the valve insides is not interferred with, even though the packing be distorted because of the pressure under which it may be placed when the valve cap is screwed into position.

Having described my invention, I claim:—

1. The combination with a member having a threaded opening said member having a chambered portion above the threaded opening, a cap within said chambered portion which cap has a dome-shaped outwardly extending portion, means on the said member engaging with the dome-shaped portion of the cap whereby the cap may have a swivel movement, a washer within said cap said washer having a central opening which is in line with the dome-shaped portion of the cap.

2. The combination with a member having a threaded opening said member having a chambered portion above the threaded opening, a cap within said chambered portion said cap having a dome-shaped extending central portion, means engaging said cap member at substantially the base of the dome, and on approximately a line contact, a washer within said cap said washer having a central opening which is on a diameter substantially the same as the base of the dome.

3. The combination with a member having a threaded opening adapted to receive the end of a valve stem, said member having a recess portion beyond the threaded opening, a cap within said threaded opening said cap having a central extending dome portion, means engaging said cap which means has a slanting surface whereby the said means engages with the cap substantially only at the base of the dome, a packing within said cap said packing having a central opening which is of a diameter substantially the same as the largest diameter of the dome.

4. The combination with a member having a threaded opening adapted to receive the end of a valve stem and provided with a chamber above said threaded opening, a cap within said chambered portion having an extension at the top thereof, means engaging said extension to center the cap within the chambered portion and also providing a restricted surface engagement between the cap and the said means to permit relatively easy turning movement of the cap, a washer within the cap and having an enlarged central opening.

5. The combination of a dust cap shell having a member therein which has a threaded opening at the end opposite the open end of the dust cap shell, said threaded opening being adapted to receive the end of a valve stem said member being provided with a recess and the upper portion of said member having flexible portions which may be pushed outwardly, said member having a central opening, an expanding member within said opening and adjacent the portions of said member which may be pushed outwardly, said expanding member having a central opening, a cap member within the said chamber and below the expanding member said cap member having a central dome shaped portion which extends into the opening in the expanding member, a packing within the cap member and adjacent the aforesaid threaded opening, the said packing and cap being adapted to transmit the thrust of the valve stem to push the expanding member into expanding position.

6. The combination with a dust cap shell having an open end, a member within said shell having frictional engagement with the wall thereof said member having a threaded opening opposite the opening in the shell said member also having a chambered portion above said opening, the portion of said member remote from the threaded opening having the walls thereof expansible, an expanding member within said chambered portion and in engagement with the expansible walls thereof said expanding member having a central opening, a cap within the said chambered portion and below the expanding member said cap having a dome-shaped central portion which extends into the opening of the expanding member, the said expanding member engaging the cap substantially only at the base of the dome in a substantially line contact, a packing within the said cap said packing having a central opening of approximately the same diameter as the greatest diameter of the dome-shaped portion of the cap.

7. The combination with a dust cap shell of a member within said shell having frictional contact with the wall thereof, said member having a threaded opening opposite the open end of the dust cap said member having a chambered portion above the threaded opening, said member having the walls remote from the threaded opening flexible, an expanding member within said chambered portion and engaging with the flexible portion of the said member said expanding member having a central opening, a cap within said chambered portion above the threaded opening and having an extending portion which extends into the opening in the expanding member said extension engaging with the expanding member to center the cap and provide a swivel connection between the cap and the expanding member, a packing within the cap member said packing having a central opening.

8. The combination with a shell of a dust cap, of a member within said dust cap said member having frictional engagement with the walls of the dust cap said member having a threaded opening at the ends thereof which is opposite the openings in the shell, said member being also provided with a chambered portion, the walls of said member being flexible, an expanding member within the said chambered portion and engaging with the portions of the walls thereof which are flexible, said expanding member having a central opening, a cap member within the chambered portion said cap member having a dome-like extension which extends into the opening in the expansion member, the inner surface of the said expanding member being slanting whereby the expanding member engages the cap substantially only at the base of the dome on substantially a line contact, a packing member within the cap said packing member having an enlarged central opening.

In testimony whereof, I hereunto affix my signature.

ADELBERT E. BRONSON.